(12) United States Patent
Liu

(10) Patent No.: US 7,050,044 B2
(45) Date of Patent: May 23, 2006

(54) PERSONAL DIGITAL ASSISTANT

(75) Inventor: Hsi Yung Liu, San-Chung (TW)

(73) Assignee: Mitac International Corp., Hsinchu (TW)

( * ) Notice: Subject to any disclaimer, the term of this patent is extended or adjusted under 35 U.S.C. 154(b) by 575 days.

(21) Appl. No.: 10/133,854

(22) Filed: Apr. 25, 2002

(65) Prior Publication Data

US 2003/0201970 A1    Oct. 30, 2003

(51) Int. Cl.
*G09G 5/00*    (2006.01)

(52) U.S. Cl. .................... 345/169; 345/901; 455/556.2

(58) Field of Classification Search ................ 345/156, 345/168, 169, 901; 361/686, 679, 683, 682, 361/680; 455/566, 557, 556.2; 700/65, 700/83, 66, 600; 312/223.2; 701/211

See application file for complete search history.

(56) References Cited

U.S. PATENT DOCUMENTS

| | | | |
|---|---|---|---|
| 6,249,672 B1 * | 6/2001 | Castiel | 455/575.4 |
| 6,525,932 B1 * | 2/2003 | Ohnishi et al. | 361/686 |
| 6,842,335 B1 * | 1/2005 | Hanson et al. | 361/683 |

FOREIGN PATENT DOCUMENTS

JP    2001-186228    *    7/2001

* cited by examiner

*Primary Examiner*—Amr A. Awad
*Assistant Examiner*—Abbas Abdulselam
(74) *Attorney, Agent, or Firm*—Merchant & Gould P.C.

(57) ABSTRACT

A kind of PDA (Personal Digital Assistant) that comprises a body and an expansion back case. The body comprises a connection groove found at its end, which connects to the body's processor. The expansion back case has default expansion functions, and it comprises a cover panel located at its end and a connection port below the cover panel. The connection port matches the connection groove when the body and the expansion back case are connected. To connect the body and the expansion back case together, simply slide the expansion back case on the back of the body until the cover panel of the expansion back case covers the connection port and the connection groove. A user may choose to carry either the binary PDA or just the body, so as to enhance the flexibility of the use of the PDA.

13 Claims, 7 Drawing Sheets

PERSONAL DIGITAL ASSISTANT

FIELD OF THE INVENTION

The invention is a kind of PDA (Personal Digital Assistant), and more particularly, a PDA with its functions embodied in an expansion back case.

BACKGROUND OF THE INVENTION

Given the popularity of the Internet, information-related commodities have become popular products that link the previous century with the present century. The simple electronic notebooks that have been evolving for years, helping people manage their lives and memorize trivialities, have been gradually replaced by PDAs. PDAs have become a technological upstart as well as the secretary of business people everywhere.

A PDA is a palm-sized computer that works as a digital personal assistant. In the beginning, the basic functions of the PDA included no more than a schedule, an agenda, a notepad and an address book. The evolution of the PDA has enabled it to be connected to a computer for synchronous data transmission, or even to be installed with various types of application software so as to expand its functions. The expanded functions, which are too numerous to list, include receiving or sending e-mail online, browsing shares-related information, recording revenue and expenditure, browsing e-books, games, spreadsheets, databases, information about daily life and wireless communication, etc. A PDA works more efficiently than a hired assistant, provided that a user makes good use of the functions of the PDA s/he owns.

However, owing to its aforesaid diversified functions, the PDA is usually quite bulky and thus inconvenient to carry. As a result, users who hold a PDA for a long time may get a sore arm. There are now designs that employ another expansion device to carry out some of the functions of PDAs, for example, an external keyboard, an external modem, and an external Bluetooth fixture, etc. However, when connected to a PDA, none of these kinds of external devices can form a binary PDA that is easy and convenient to use (the protruding part prevents ease of use) and good looking.

For the aforesaid reasons, the invention puts forward a PDA with an expansion back case that embodies diversified, but seldom used, functions, so that the body is smaller and lighter. Thus, it will be easier for a user to hold the PDA and s/he may choose to carry either the binary PDA or just the body so as to enhance the flexibility of the use of PDA. In addition, putting the body and the expansion back case together produces no protruding part that can affect the ease of use, and does not detract from the appearance of the binary PDA.

OBJECT AND SUMMARY OF THE INVENTION

The primary object of the invention is to provide a kind of PDA with diversified functions but with a smaller and lighter body, so that a user finds it easy to hold the PDA and has the ability to choose to carry either the binary PDA or just the body so as to enhance the flexibility of the use of PDA.

The PDA disclosed by the invention comprises a body and an expansion back case. The body comprises a connection groove found at its end that connects to the body's processor. The expansion back case has default expansion functions, and it comprises a cover panel and a connection port. The cover panel is found at the end of the expansion back case, whereas the connection port is found below the cover panel. The connection port matches the connection groove when the body and the expansion back case are connected. To connect the body and the expansion back case for data transmission, simply slide the expansion back case on the back of the body until the cover panel of the expansion back case covers the connection port and the connection groove. Some of the functions of the body are embodied in the separable expansion back case in order to provide diversified functions for the PDA and make its body smaller and lighter. Therefore, a user finds it easy to hold the PDA and may choose to carry either the binary PDA or just the body so as to enhance the flexibility of the use of PDA.

The aforesaid expansion back case may have either a single function or diversified functions. According to the type of function, the functions embodied in the aforesaid expansion back case include a transmission interface for data transmission, a player for playing music, memory for data storage, a power supply, and an input unit for inputting data. In addition, the expansion back case has a fastening unit to secure or release the locking relationship between the body and the expansion back case.

To gain further insight into the object, the characteristics of the structure and the functions of the invention, illustration and detailed explanations are given below:

DETAILED DESCRIPTION OF THE PREFERRED EMBODIMENT

As shown in FIGS. 1 and 2, the PDA disclosed by the invention comprises a body 10 and an expansion back case 20. The body 10 comprises a processor 11, a monitor 12 and a connection groove 13, wherein the processor 11 processes and stores electronic data of the body 10, the monitor 12 displays the data of the body 10, and the connection groove 13 is installed at the end (the top, as shown in the figures) of the body 10 and connected to the processor 11 for data transmission.

The expansion back case 20 has default expansion functions. It comprises a cover panel 21, a connection port 22, and a fastening unit 23, wherein the cover panel 21 is installed at the end of the expansion back case 20. Under the cover panel 21 is a connection port 22 that matches the connection groove 13 whenever the body 10 and the expansion back case 20 are connected. To connect the body 10 and the expansion back case 20 for data transmission, simply slide the expansion back case 20 on the back of the body 10 until the cover panel 21 of the expansion back case 20 covers the connection port 22 and the connection groove 13. The fastening unit 23 secures or releases the locking relationship between the body 10 and the expansion back case 20 whenever the body 10 and the expansion back case 20 are connected or separated from one another.

The expansion back case 20 may have either a single expansion function or diversified functions. Its function can be one, or part, of the following: wireless transmission, cable transmission, playing music, data storage, electric supply and data input, etc.

When the expansion back case 20 possesses both a wireless transmission function and a cable transmission function, it acts as a transmission interface, such as a PCMCIA card (Personal Computer Memory Card International Association), a Bluetooth module or a connector, for the purpose of data transmission.

When the expansion back case 20 possesses a music playing function, it acts as a player that plays the music stored by the body 10 or by the player itself. However, it can play music only when it includes memory.

When the expansion back case 20 possesses a data storage function, it acts as memory for storing data.

When the expansion back case 20 possesses an electric supply function, it acts as a power supply for supplying electricity for contingent use.

As shown in FIG. 3, when the expansion back case 20 possesses a data input function, it acts as an input unit, such as a set of numeric buttons or a keyboard, for inputting data into the body 10.

Again, as shown in FIGS. 4A, 4B, 4C & 4D, the fastening unit 23 comprises a groove region 231, a fastener 232 and a releaser 233. The groove region 231 is found in the two opposite ends of the body 10. The two ends connect to the two ends of the connection groove 13, respectively. At the end of the groove region 231 is a groove 2311, installed on the cover panel 22 of the expansion back case 20. The fastener 232 matches the groove region 231. At the end of the fastener 232 is a barb 2321 that matches the groove 2311. When the body 10 and the expansion back case 20 are connected, the fastener 232 moves along the groove region 231 until the barb 2321 locks with the groove 2311 for securing the locking relationship between the body 10 and the expansion back case 20. The releaser 233 is axially connected inside the body 10 and it matches the groove region 231. It releases the locking relationship between the body 10 and the expansion back case 20. It comprises a button 2331 and a pushing region 2332, both installed on the two sides of the body 10. The pushing region 2332 faces the place where the barb 2321 matches the groove 2311. When the button 2331 is pressed, the releaser 233 rotates around the point of axial connection, making the pushing region 2332 push the barb 2321 out of the groove 2311, which releases the locking relationship between the body 10 and the expansion back case 20.

To put the body 10 and the expansion back case 20 together, let the body 10 lie on the expansion back case 20 (the figures show the back of the body 10), make the connection groove 13 and the connection port 22 face each other and then move them toward each other (that is, the expansion back case 20 slides horizontally on the body 10). When the connection groove 13 connects with the connection port 22, the fastener 232 moves along the groove region 231, so that whenever the barb 2321 reaches the groove 2311, the barb 2321 locks with the groove 2311, eventually securing the locking relationship between the body 10 and the expansion back case 20. On the other hand, to separate the barb 2321 from the groove 2311, press the button 2331 and the pushing region 2332 moves toward the barb 2321 until the barb 2321 is pushed out of the groove 2311, which releases the locking relationship between the body 10 and the expansion back case 20.

In addition, when the body 10 and the expansion back case 20 are connected, the cover panel 21 lies flush on top of the body 10 so as to form a binary PDA (without any protruding part that may affect the ease of use of the PDA) that is easy and convenient to use, as well as good looking.

In the event that the groove region 231 and the fastener 232 do not have the groove 2311 and the barb 2321, respectively, they can be linked up and thus the body 10 and the expansion back case 20 can be connected by means of a tight-matched design. That means the body 10 is a little larger than the expansion back case 20, so the two can match very tight.

The Effect Achieved

The invention is a PDA with its functions expanded by an expansion back case, which is separable from the body of the PDA. Accordingly, the PDA is petite and portable, and a user may choose to carry either the binary PDA or just the body, so as to enhance the flexibility of the use of PDA. In addition, whenever the body and the expansion back case are connected, the cover panel of the expansion back case lies flush on top of the body, so there is no protruding part that may affect the ease of use of the PDA, and the binary PDA is good looking.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

Figure 1:
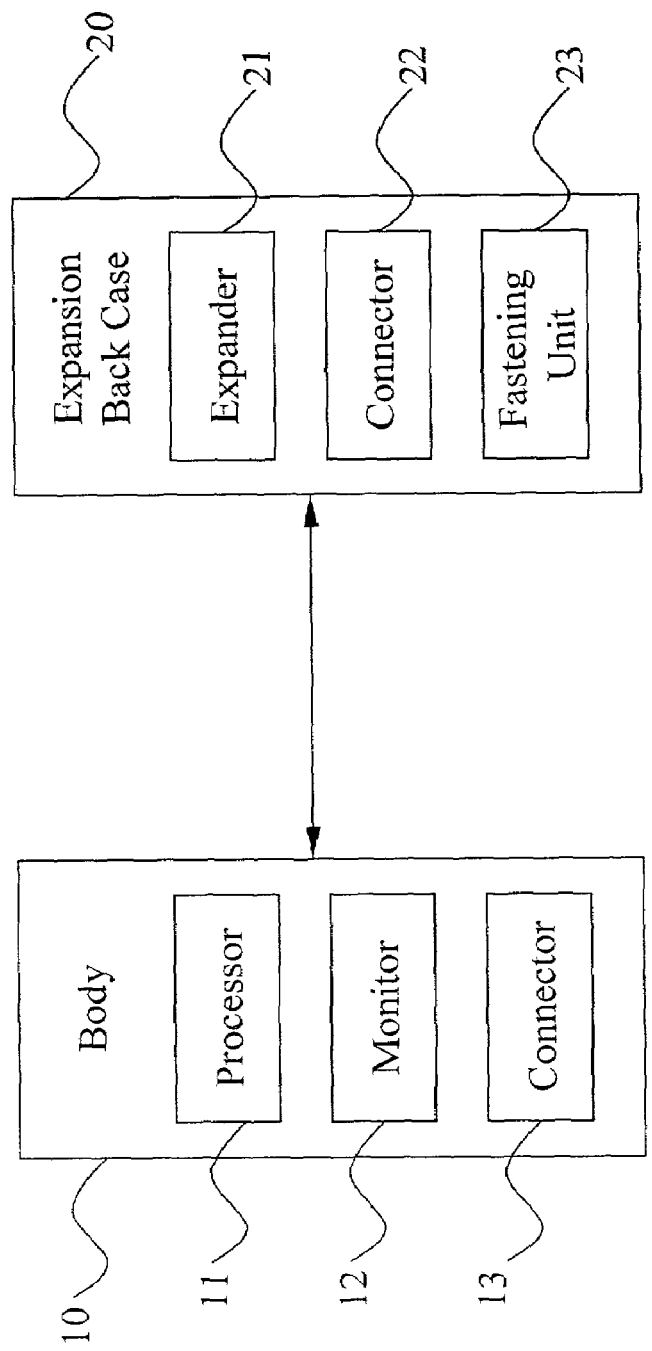
FIGS. 1 and 2 depict the relationship between a PDA body and an expansion back case.
Figure 2:
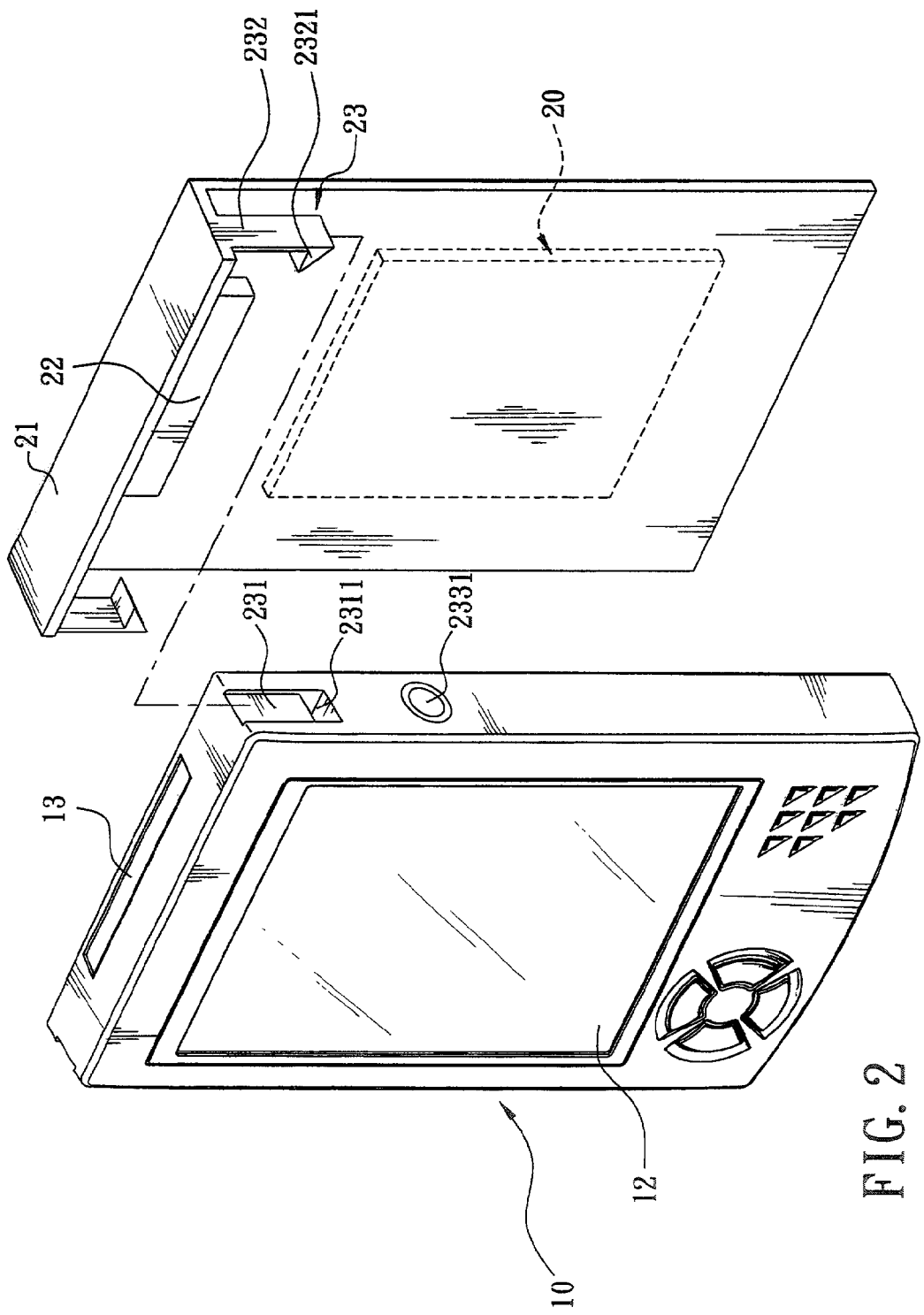
Figure 3:
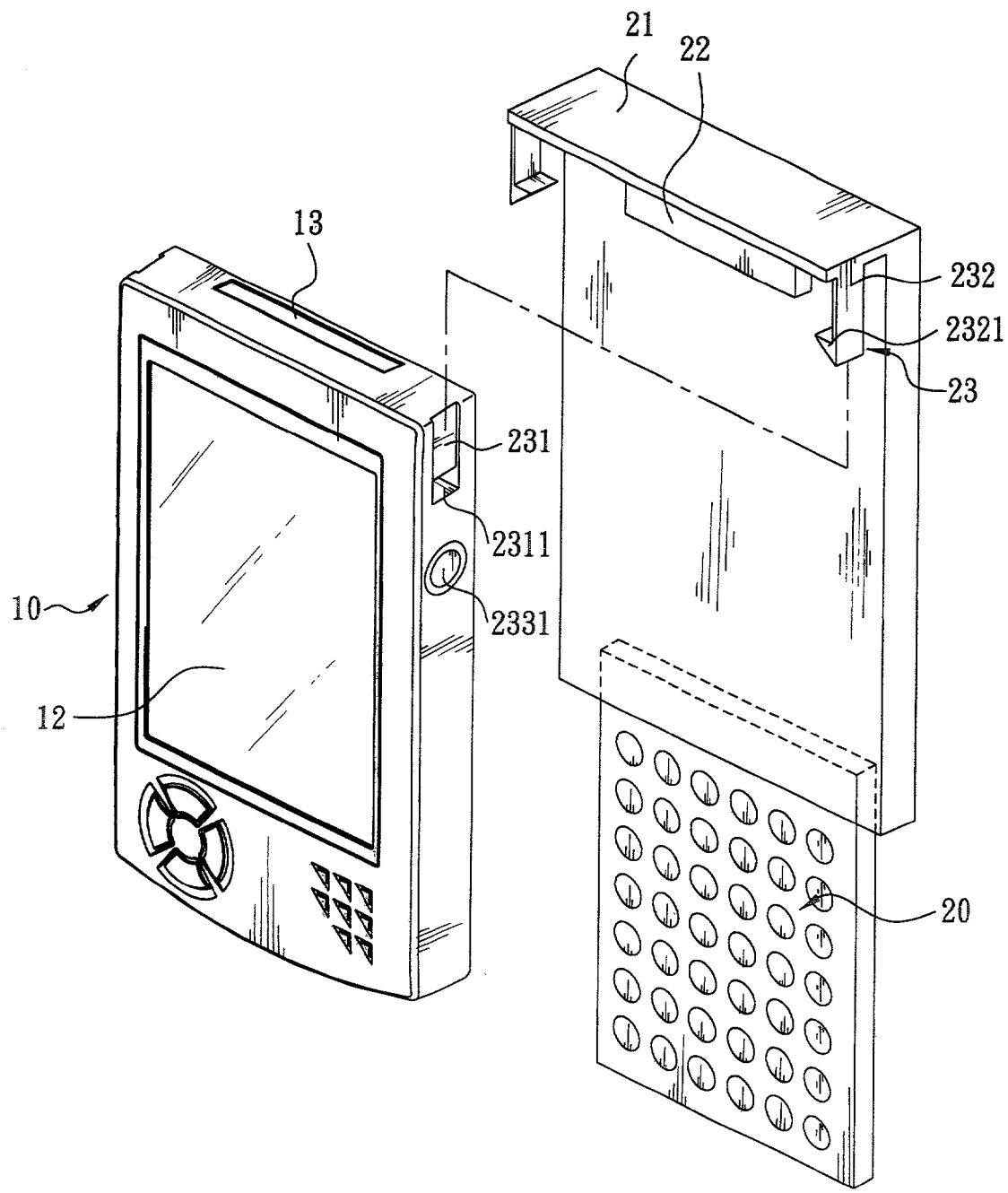
FIG. 3 depicts an expansion back case that functions as an input unit.
Figure 4A:
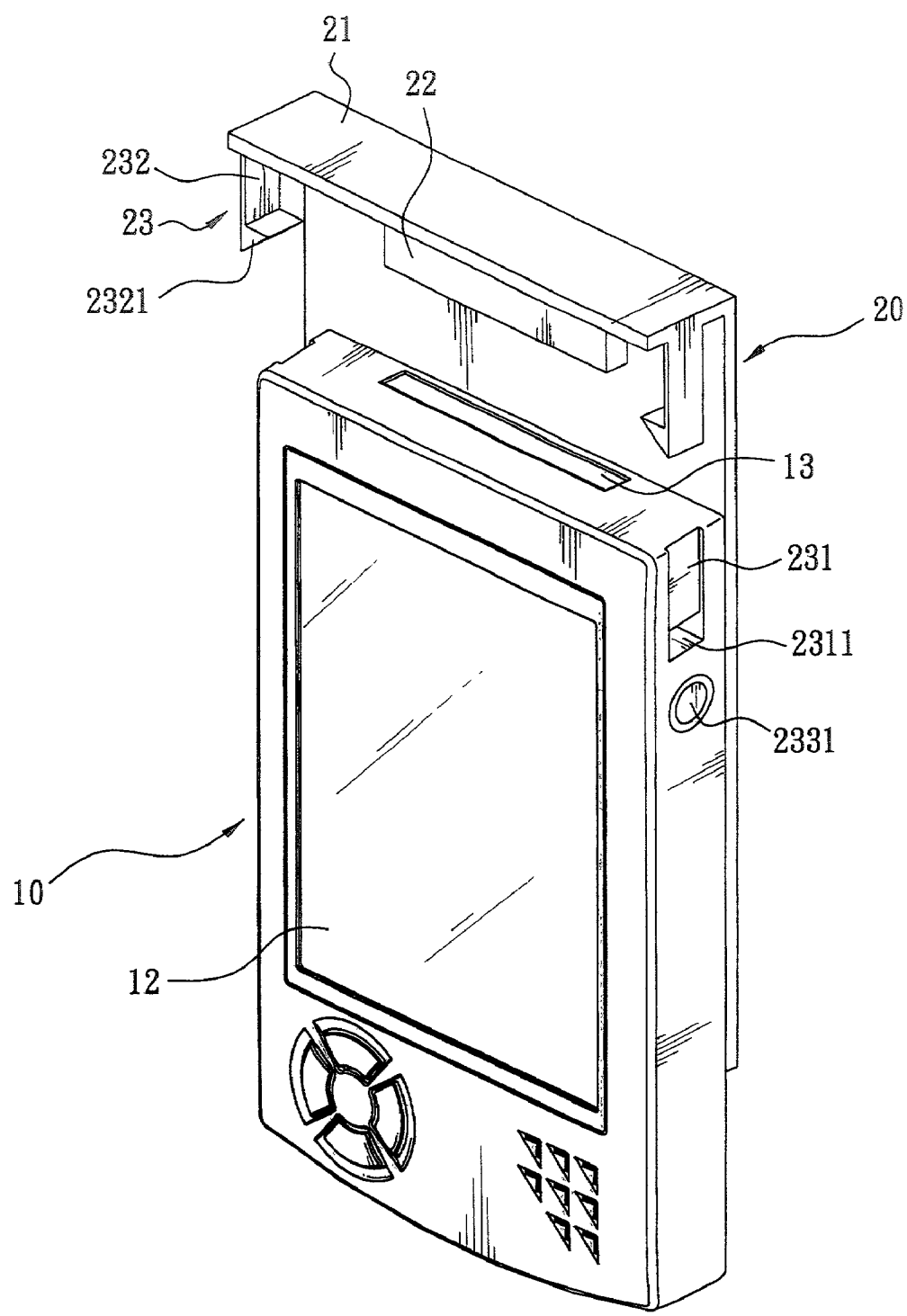
FIGS. 4A, 4B, 4C & 4D illustrate how a body and an expansion back case are connected or separated from one another.
Figure 4B:
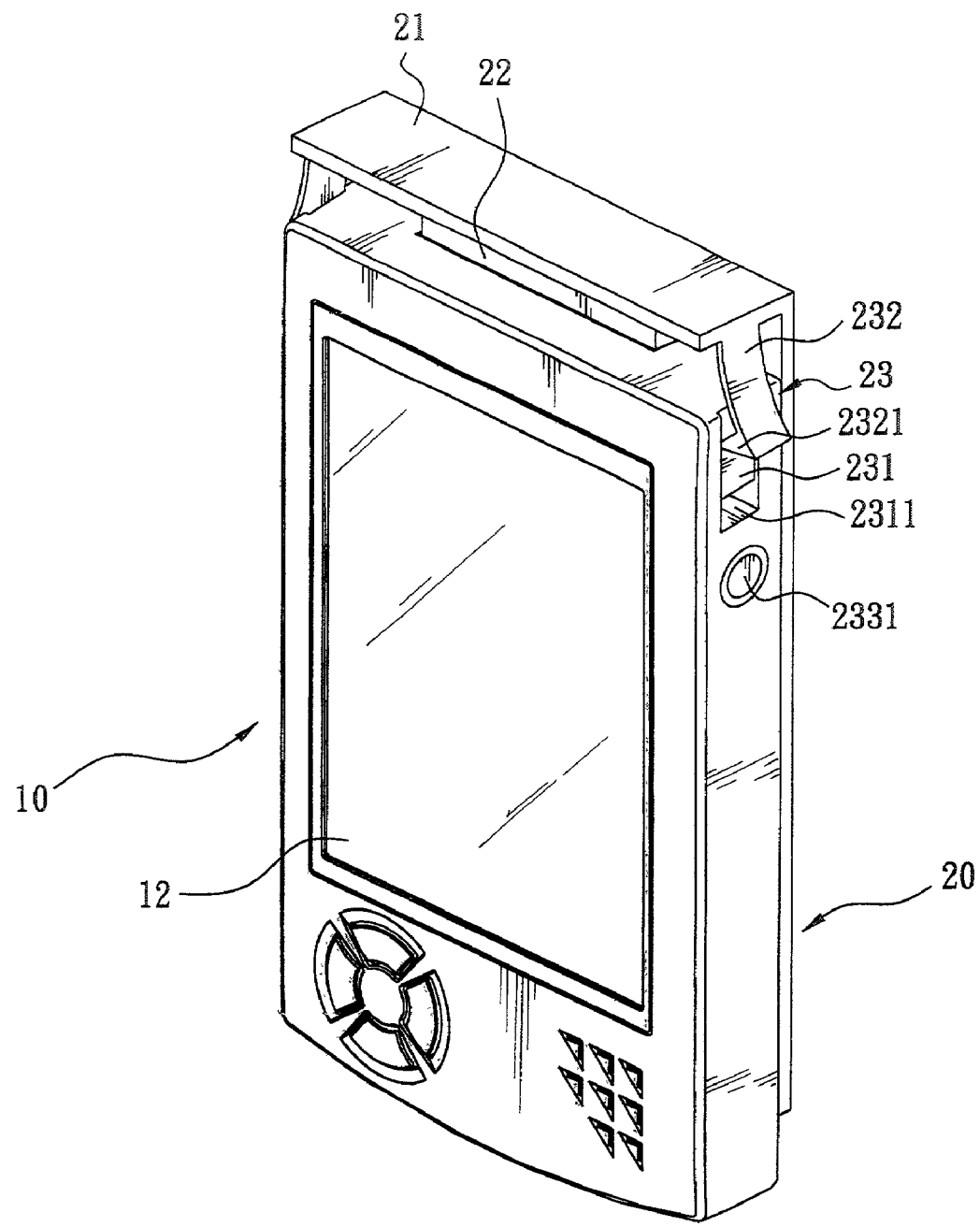
Figure 4C:
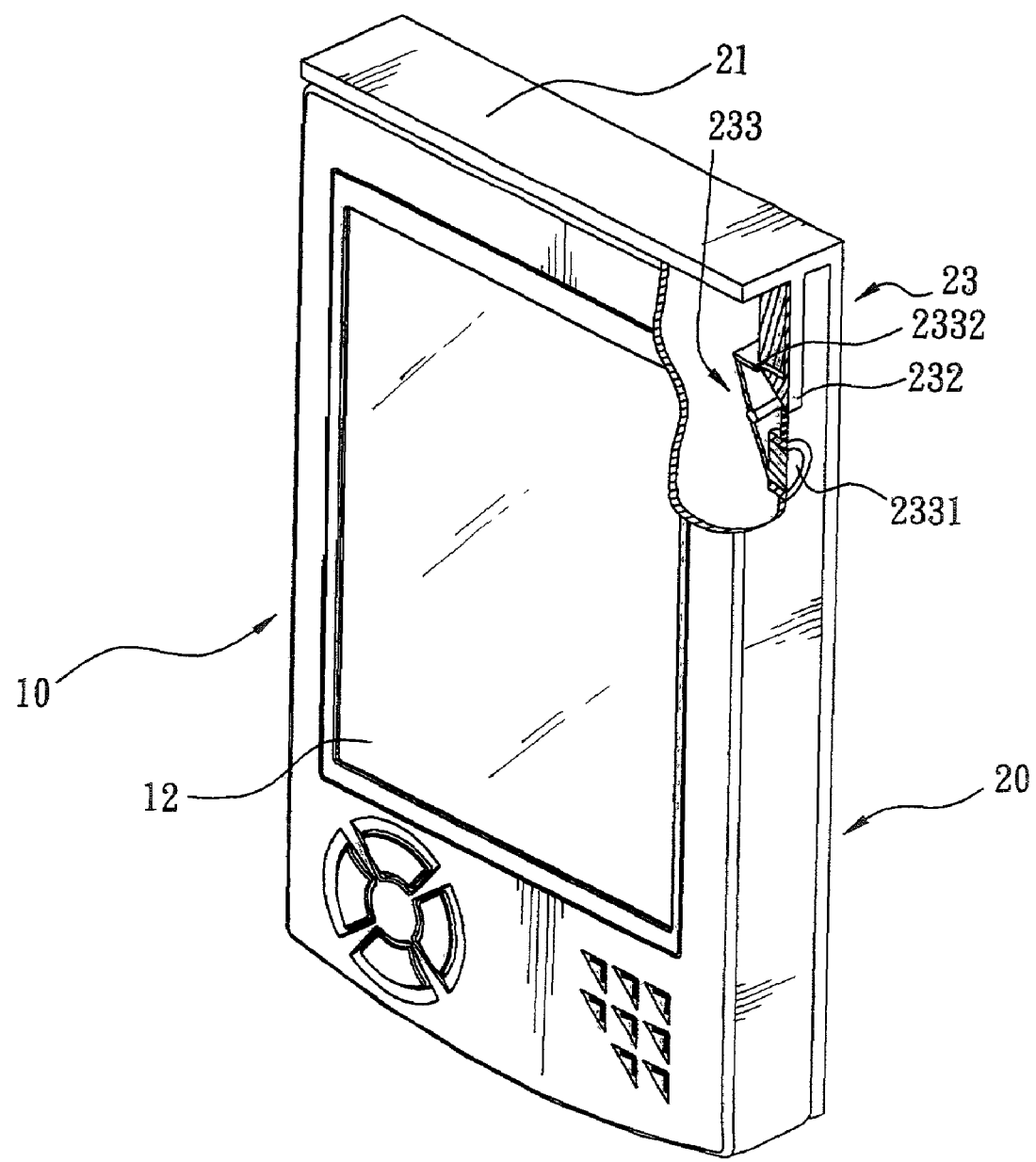
Figure 4D:
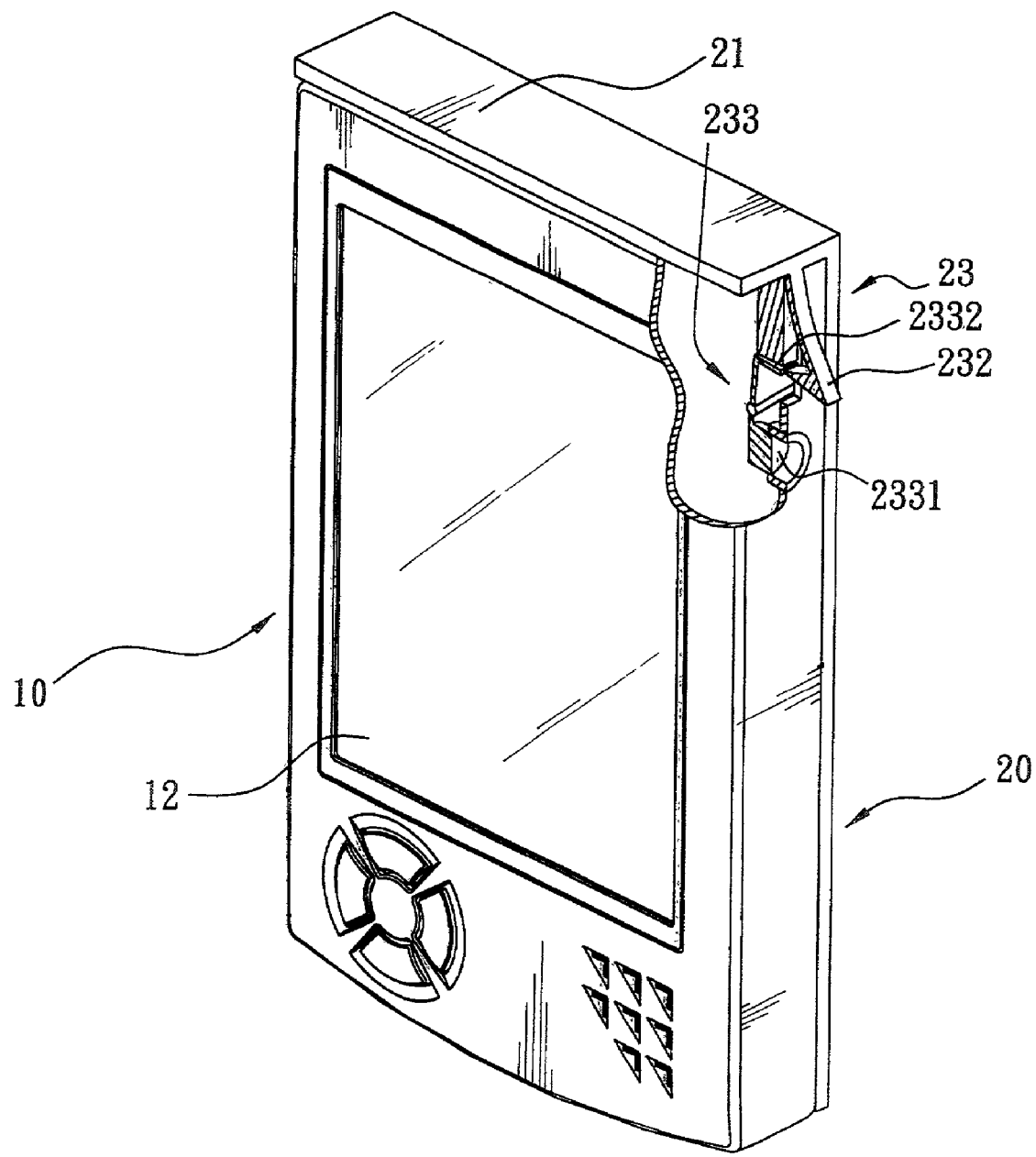

What is claimed is:

1. A PDA that comprises:
    a body comprising a processor, a monitor and a connection groove, the processor processes and stores the data of the body, the monitor displays the data of the body, the connection groove is installed at one end of the body and connected to the processor;
    an expansion back case, sliding on the body and comprising a cover panel and a connection port, the cover panel is installed at one end of the expansion back case, the connection port is located under the cover panel, the connection port is coupled to the connection groove and the cover panel covers the connection port and the connection groove when the body and the expansion back case are connected; and
    a fastening unit for securing and releasing the body and the expansion back case, the fastening unit including two groove regions and two corresponding fasteners, the groove regions being located on two opposing sides of the body and extending to the end of the body at which the connection goove is located, the fasteners being installed on the cover panel and arranged and configured to cooperate with the respective groove region to secure the body to the expansion back case when the body and the expansion back case are connected.

2. The PDA of claim 1, wherein the fastener of the fastening unit further comprises a barb that installed at one end of the fastener, and the groove region comprises a groove that matches the barb, the barb locks with the groove when the body and the expansion back case are connected.

3. The PDA of claim 2, wherein the fastening unit further comprises two releasers which are axially connected inside the body and match the two said groove regions, the two releasers respectively comprise a button and a pushing region, at two ends of the two releasers, wherein the pushing region faces where the barb locks with the groove, whenever the button is pressed, the pushing region pushes the barb out of the groove, and eventually releasing the body and the expansion back case.

4. The PDA of claim 1, wherein the expansion back case is a transmission interface.

5. The PDA of claim 4, wherein the expansion back case is a PCMCIA card.

6. The PDA of claim 4, wherein the expansion back case is a Bluetooth module.

7. The PDA of claim 4, wherein the expansion back case is a connector.

8. The PDA of claim 1, wherein the expansion back case is a player.

9. The PDA of claim 1, wherein the expansion back ease is a memory.

10. The PDA of claim 1, wherein the expansion back case is a power supply.

11. The PDA of claim 1, wherein the expansion back case is an input unit.

12. The PDA of claim 11, wherein the expansion back case is a set of buttons.

13. The PDA of claim 11, wherein the expansion back case is a set of numeric buttons.

* * * * *